Figure 1:
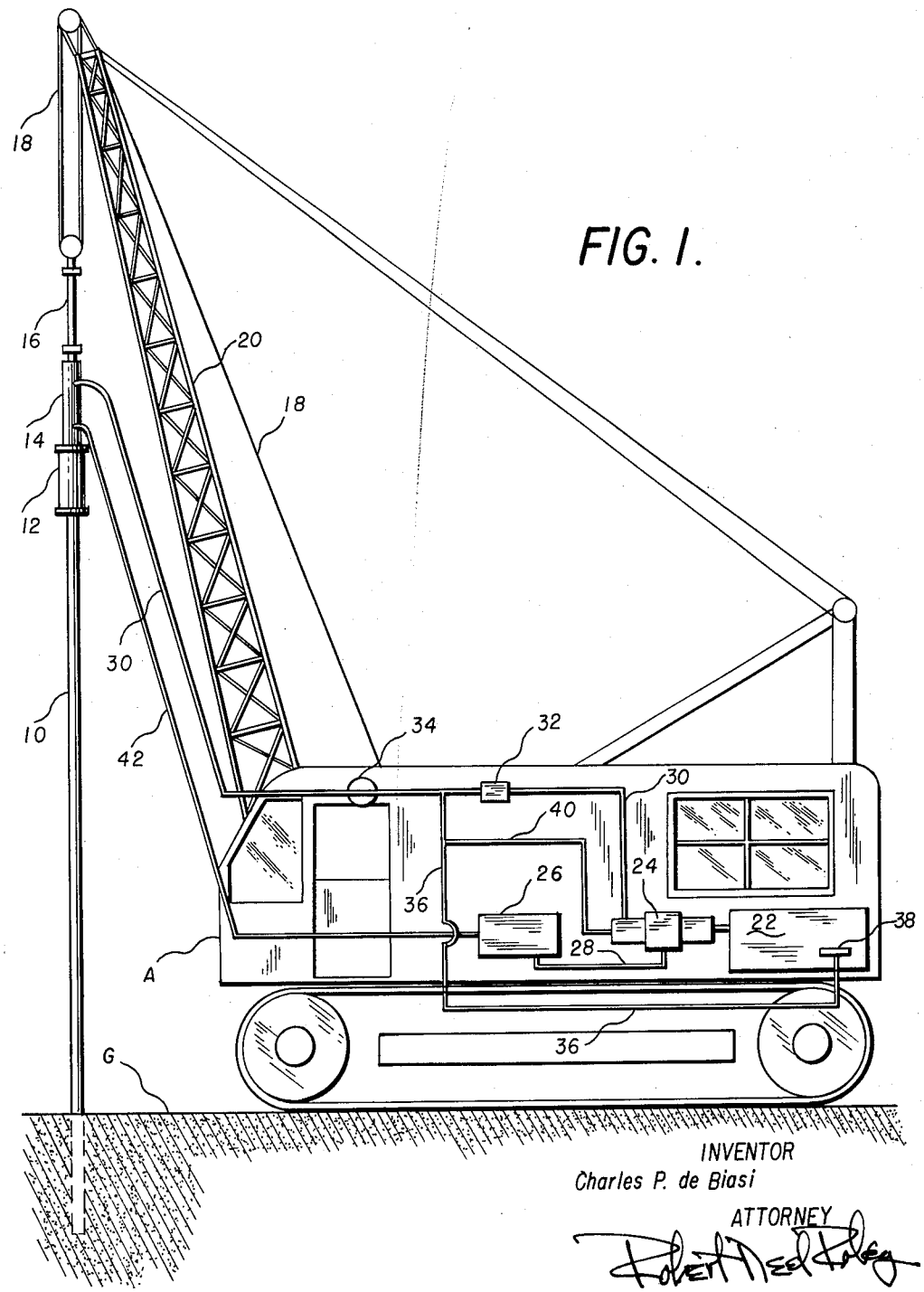

INVENTOR
Charles P. de Biasi

June 21, 1966     C. P. DE BIASI     3,256,789
HYDRAULICALLY ACTUATED SYSTEM AND APPARATUS FOR
COMPACTING MATERIAL WITH AUTOMATIC COMPACTION
INDICATING AND CONTROLLING MECHANISM
Filed Sept. 27, 1962     3 Sheets-Sheet 2
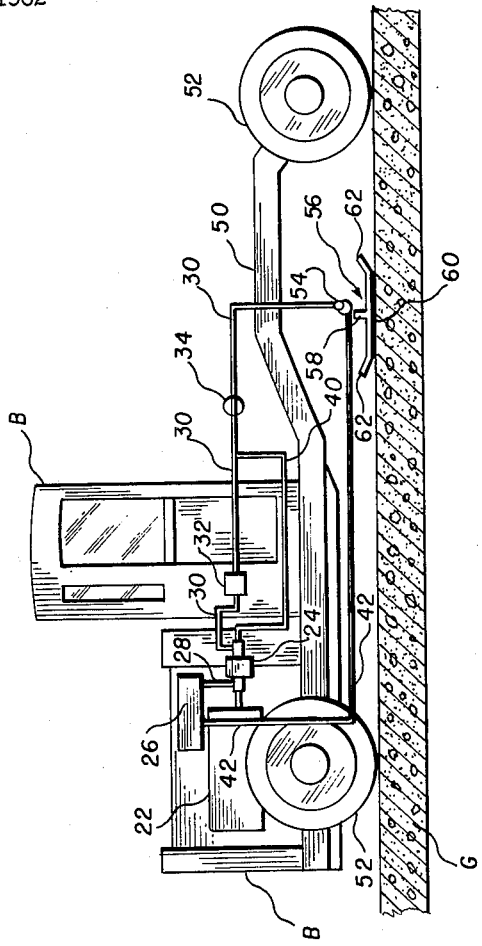
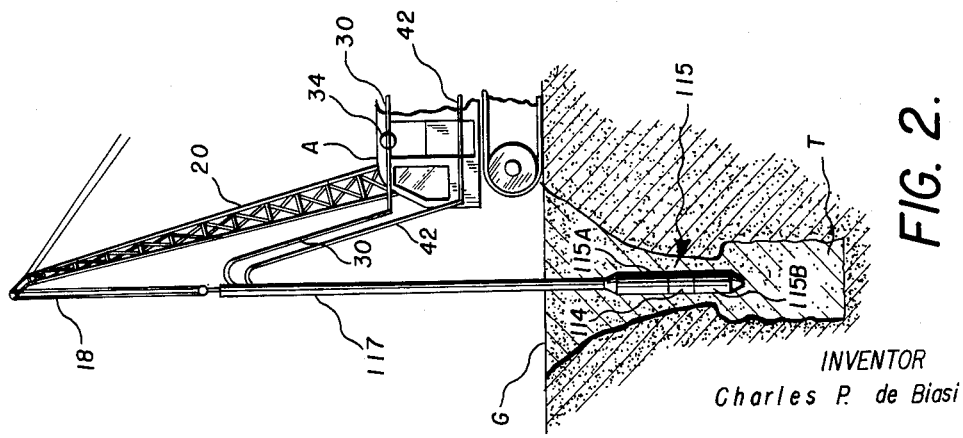
INVENTOR
Charles P. de Biasi
ATTORNEY Charles P. de Biasi
INVENTOR

ATTORNEY

# United States Patent Office 3,256,789
Patented June 21, 1966

3,256,789
HYDRAULICALLY ACTUATED SYSTEM AND APPARATUS FOR COMPACTING MATERIAL WITH AUTOMATIC COMPACTION INDICATING AND CONTROLLING MECHANISM
Charles P. de Biasi, 74 Braman Road, Waterford, Conn.
Filed Sept. 27, 1962, Ser. No. 226,567
14 Claims. (Cl. 94—48)

This application is a continuation-in-part of application Serial Number 186,603, filed Apr. 6, 1962, now Reissue Patent Number 25,702, entitled Hydraulic System and Apparatus for Vehicles, issued Dec. 22, 1964, as a reissue application for United States Letters Patent Number 3,003,262.

The present invention relates generally to material compaction, and is more particularly concerned with a novel system, method, mechanism, equipment, arrangement or apparatus employing hydraulic means for the compaction of material by sonic frequency vibration and wherein the desired degree of compaction of such material may be automatically and directly valuated, controlled, registered and achieved.

Conventional material compacting equipment of the sonic vibrator compacting type, as known, does not have means for automatically providing a determination at any given instant of the bearing value of material being compacted to support a load as effected by the compaction produced by driving piling therein, such as in building construction, or by surface compaction thereof, as in highway or street construction.

It is generally agreed among engineers that a condition of over-compaction of material may exist or be produced in a material load bearing surface. As far as is known there exists only two accepted methods of valuating or testing the amount of compaction imparted to a compactible material.

The first and most common method of valuating or testing compacted material consists of excavating a small volume of the compacted material and comparing the weight per unit volume thereof against a laboratory sample. The second method, still only in an introductory, experimental or development stage, comprises special nuclear equipment, manufactured by the Nuclear-Chicago Corporation of Des Plaines, Illinois. Both of these methods involve only random spot checks at dispersed points of the compacted material and since a complete coverage of a given area of the compacted material would be an economic impossibility, these methods are not fully comprehensive and hence not completely satisfactory.

With the system, method, mechanism, arrangement, equipment or apparatus of this invention, however, a complete indication of the degree of compaction of material achieved at any stage of compaction and at any instant is automatically indicated, and the force necessary to achieve varying degrees of compaction of the material also being simultaneously and automatically varied regardless of whether the compaction of the material be produced by driving of piling or by surface compaction of the compactible material.

It is therefore a primary object of this invention to disclose, describe, illustrate and show a system, method, mechanism, arrangement, equipment or apparatus for compacting material, such as ground, earth, dirt, gravel, sand, rocky material or the like, and simultaneously obtaining automatically an indication of the degree of compaction being achieved.

It is another object of this invention to disclose, describe, illustrate and show a system, method, mechanism, arrangement, equipment or apparatus in which hydraulic mechanism is employed to actuate compacting equipment and automatically indicating the degree of compaction or density achieved in the material while the compacting operation is in progress.

Another object of this invention is to provide a novel system, method, mechanism, arrangement, equipment or apparatus for compacting material, such as ground, earth, dirt, road paving materials, or the like, with sonic vibrator compacting equipment such as pile drivers, surface rollers, or plate-like tamping devices and wherein the degree of compaction or density of the material achieved at any given instant of compacting operations is instantly interpretable by the reading of a hydraulic pressure indicator device, such as a gauge.

A still further object of this invention is to provide a system, method, mechanism, arrangement, equipment or apparatus for compacting material by means of hydraulically actuated sonic arrangements wherein the degree of compaction obtained throughout the entire area of the material being compacted may be ascertained simultaneously with the compacting operation thereof as it is performed.

It is also a further object of this invention to provide a system, method, mechanism, arrangement, equipment or apparatus for hydraulically actuating sonic vibrator compacting equipment inclusive of penetration, rolling or tamping arrangements wherein means may be provided for automatically indicating the degree of compaction achieved and for varying the hydraulic power output in conformity with the energy demands of the compacting equipment.

It is a still further object of this invention to provide a system, method, mechanism, arrangement, equipment or apparatus for sonically compacting compactible materials and wherein the compacting arrangement is actuated by a hydraulic system having means therein for automatically interpreting the degree of compaction achieved by the energy demands of the compacting apparatus and for simultaneously and automatically varying the power output of the hydraulic system accordingly.

It is yet another object of this invention to provide various types of vehicles for transporting sonic compacting mechanism, arrangement, equipment or apparatus, with a hydraulic system for actuating the sonic vibrator compacting mechanism, arrangement, equipment or apparatus and wherein a variable output hydraulic pump device is power-coupled to a drive or propulsion unit, such as an internal combustion engine of the vehicle, the pump device actuating a hydraulic arrangement for driving the sonic vibrator compacting mechanism, arrangement, equipment, or apparatus, the hydraulic system incorporating means for determining the amount of compaction attained in the material and also interpreting the energy demands of the sonic vibrator compacting mechanism, arrangement, equipment or apparatus and modifying the output of the pump device accordingly.

It is still a further and another object of this invention to provide various types of sonic vibrator compacting transport equipment with a hydraulic system for actuating, driving or powering the sonic vibrator compacting equipment wherein a variable displacement hydraulic pump structure is power-coupled to the drive of the transport equipment, the pump structure actuating a hydraulic arrangement for powering the sonic vibrator compacting equipment, the hydraulic system incorporating means to vary the frequency of the sonic vibrator compacting equipment in conformity with the natural frequency of the compacted material.

Other objects, advantages and important features of the invention will be apparent from a study of the specification following, taken with the drawing, which together describe, disclose, illustrate and show certain embodiments, modifications, procedures and alternatives of the invention and what is now considered and believed to be the best method of practicing the principles thereof. Still other embodiments, modifications, procedures or equivalents may be subject to those having the benefit of the teaching herein and such other embodiments, modifications, procedures or equivalents are intended to be reserved especially as they fall within the scope and breadth of the subjoined claims.

Figure 4:
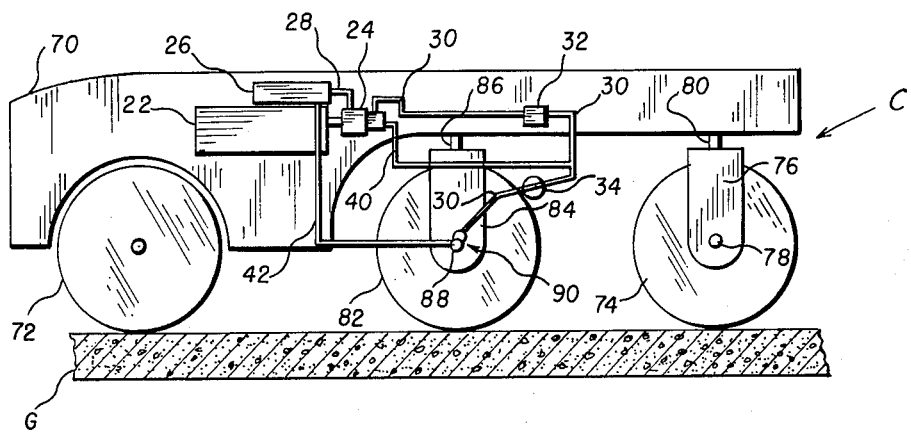
Figure 5:
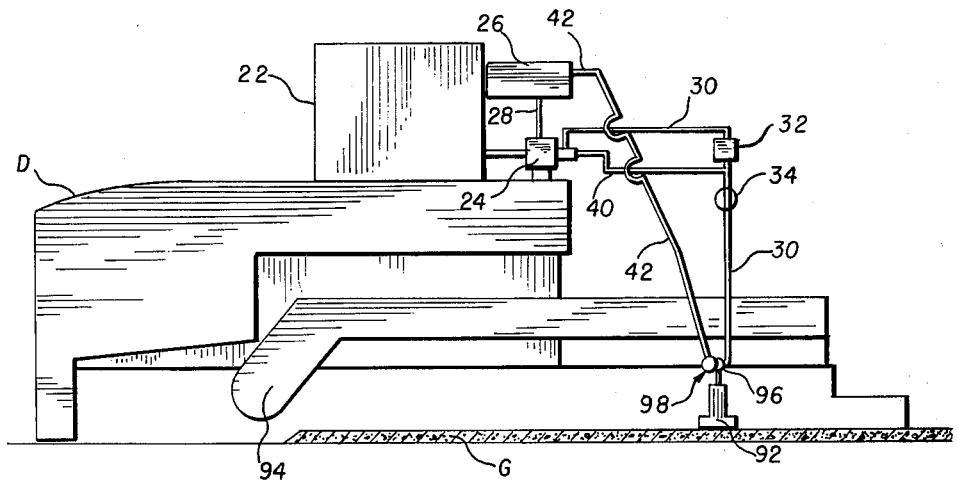

In the drawing:

FIGURE 1 is a schematic side elevational view showing a mobile type vehicle for transporting a pile driver of the vibratory type having incorporated therewith a hydraulic system, method, mechanism, arrangement, equipment or apparatus of the present invention wherein a fixed displacement hydraulic arrangement is located above an upper or trailing end portion of a piling unit adapted to be driven into ground;

FIGURE 2 is a schematic view, similar to that of FIGURE 1, but showing equipment for compacting back-filled material in an open trench in which a fixed displacement hydraulic arrangement is located close to a bottom or leading end portion of a remotely located and suspended sonic vibratory compacting unit which simultaneously provides means for determining the bearing value or density of the back-filled material being compacted;

FIGURE 3 is a schematic side elevational view of a vehicle for transporting a surface tamping machine employing tamping plates vertically sonically vibrated by hydraulic means to compact compactible road surfacing material;

FIGURE 4 is a schematic side elevational view of a vehicle for transporting a roller type surface compacting machine employing a vertically sonically vibrated hydraulically operated tamping roller, and FIGURE 5 is a schematic side elevational view of a vehicle for transporting asphalt or concrete spreader equipment having a conventional tamping bar for tamping spread material which is sonically compacted by means driven by a hydraulic pressure system.

Attention is now directed to the drawing wherein there is shown in FIGURE 1, a sonic pile driver which is supported or carried by a transport vehicle A of the type disclosed in United States Letters Patent Number 2,975,846 issued Mar. 21, 1961 to A. G. Bodine, Jr., for Acoustic Method and Apparatus for Driving Piles, to which the improved hydraulic system, method, mechanism, arrangement, equipment or apparatus of this invention has been applied.

As illustrated, an elastic pile unit 10, of any desired cross-sectional area, such as shown in the Bodine, Jr., patent identified above, is clamped in and hung from an adapter clamp device 12 rigidly secured adjacent the upper end portion thereof to a sonic vibrator unit 14 which is actuated or operated by a fixed displacement hydraulic arrangement associated therewith and the sonic vibrator unit 14 is in turn secured to a spring suspension device 16 which is suspended from hoisting and lowering cable means 18 that is reeved about a boom point sheeve of an adjustably pivotally mounted crane boom 20 of the transport vehicle A, here shown for the purpose of illustration only as of the caterpillar or endless tread type. The cable means 18 is suitably controllable from an operator's control station, not identified, of the transport vehicle A to raise and lower the pile unit 10, as desired.

Coupled to and driven by a source of power or energy such as a propulsion unit 22 of the transport vehicle A, which may be an internal combustion engine mounted within an enclosure of the transport vehicle A, by suitable coupling means, is a variable displacement hydraulic pump device 24 for supplying hydraulic pressure fluid to the fixed displacement hydraulic arrangement for powering the sonic vibrator unit 14. For purposes of illustration, the pump device 24 may be a Sundstrand Hydraulic Division 32 PV Series variable displacement pump with control structure in the form of wobbler structure defining integral fixed orifice control means.

A source of reservoir 26 for hydraulic pressure fluid having supply line or conduit means 28 is in communication with the inut or intake side of the pump device 24.

Pressure fluid supply conduit means 30 is connected to the discharge, exhaust or outlet side of the pump device 24 and connected, by means of a suitably flexible coupling to the fixed displacement hydraulic arrangement for powering the sonic vibrator unit 14.

Mounted along the pressure fluid conduit means 30 is variable orifice control valving means 32 together with an indicator device 34 which is located intermediate the variable orifice control valving means 32 and the fixed displacement hydraulic arrangement of the sonic vibrator unit 14, with the indicator device 34 preferably taking the form of a suitable hydraulic pressure gauge.

Branch conduit means 36 connects with the hydraulic pressure fluid conduit means 30 at a location therealong which is intermediate the variable orifice control valving means 32 and the indicator device 34 and connects with a governor device 38 of the propulsion unit 22 of the transport vehicle A to modify the governor setting in accordance with the energy demands of the hydraulic system, as will be later explained in more detail.

Connected to the branch conduit means 36, intermediate the connections thereof with the pressure fluid conduit means 30 and the governor device 38, is a pump pressure control line or control conduit means 40 which is connected back to the discharge, exhaust or outlet side of the variable displacement hydraulic pump device 24. Return hydraulic fluid conduit means 42 having a suitably flexible coupling connects the discharge or outlet side of the fixed displacement hydraulic arrangement for the sonic vibrator unit 14 with the source of fluid in the reservoir 26 of the hydraulic system.

The pump pressure control conduit means 40 provides an important aspect of the present invention in that it defines means for varying the fluid pressure discharge of the pump device 24 in response to the quantity of by-passed pressurized fluid through the pressure fluid conduit means 30. In this way, the fluid pressure discharge of the pump device 24 is varied in response to the demands of the fixed displacement hydraulic arrangement for powering the sonic vibrator unit 14. This integrated control structure measures the output or demand on the hydraulic system and is self compensating by varying the angle of the wobbler plate of the pump device 24 in response to the pressure in the pump pressure control conduit means 40. Correspondingly, as the energy demand of the fixed displacement hydraulic arrangement for the sonic vibrator in unit 14 varies, the control pressure in the pump pressure control conduit means 40 adjusts the governor device 38 of the propulsion unit 22 to vary the speed thereof and drive the pump device 24 accordingly.

If desired, reference may be made to the above-identified Reissue Patent Number 25,702, and particularly FIGURE 9 of the drawing thereof, for a more detailed illustration of the hydraulic system of the instant application wherein, in FIGURE 9 of the Reissue Patent Number 25,702 the supply conduit means 38, 52, 56 thereof corresponds to the supply conduit means 30 of the instant disclosure with the control conduit means 58, 60 and 62 of Reissue 25,702 corresponding to the control conduit means 36-40 of the instant concept and it is to be noted that in FIGURE 9 of the Reissue 25,702 the pump and the pump control structure, valving and driven units are clearly identified by legend.

In describing the pile driving operation of the pile unit 10 and the related material compaction aspect thereof, it is to be recalled that all bodies of material each have a sonic frequency or natural vibratory frequency regardless of whether or not the frequency is audible. Accordingly, advantage is herein taken of a phenomenon known as Poisson's ratio which refers to the fact that an elastic expansion or elongation in one direction in an elastic member or material causes a compensating elastic dilation in another direction. Thus, by generating generally longitudinal waves in the elongate elastic pile unit 10 a corresponding vibratory change in cross-section takes place causing the wall portion of the pile unit 10 to vibrate generally laterally relative to the longitudinal axis thereof against the contacting surfaces of the material of the surrounding earth or ground G. Since this effect occurs at fairly high or sonic vibration frequencies at which the earth or ground material G does not respond the material G in effect momentarily stands back, whereby a small clearance is provided between the material G and the wall portion of the pile unit 10.

With the pile unit 10 generally vertically suspended by the adapter clamp device 12 from the sonic vibrator unit 14 by means of the spring suspension device 16, the cable means 18 and the crane boom structure 20, and with the variable displacement hydraulic pump device 24 driving the sonic vibrator unit 14 at high or sonic speed to impart generally longitudinal and transverse sonic vibrations thereto, the cable means 18 is actuated, by means not shown, to lower the pile unit 10 into end contact or engagement with the material G. As elongations and contractions are imparted to the pile unit 10, by the sonic vibrator unit 14 operating at high or sonic speed by the fixed displacement hydraulic arrangement associated therewith and as above explained, the compaction of the material G now substantially contacting the lower end portions of the pile unit 10 provides sufficient minute side and bottom clearance to permit the weight of the pile unit 10, influenced by the longitudinal vibrations imparted thereto, to drive or force the pile unit 10 down into the material G. As the pile unit 10 is driven deeper, the increasing area of side wall contact of the side wall portion of the pile unit 10 with the material G, as well as the increased compaction of the material G beneath the lower end portion of the pile unit 10, requires a greater energy output demand from the pump device 24 and the propulsion unit 20 driving the latter. The greater load or demand on the fixed displacement hydraulic arrangement for powering the sonic vibrator unit 14 causes a pressure build-up of fluid pressure in the pressure fluid conduit means 30 which reacts back through the branch pressure conduit means 36 and the pump pressure control conduit means 40 to simultaneously increase the speed of the propulsion unit 22 and the output fluid pressure flow of the pump device 24 driven by the propulsion unit 22. Since the pressures obtained in the hydraulic pressure conduit means 30, 36 and 40 are indicated on the indicator device 34 the readings of this gauge are therefore directly indicative of the compaction of the material G effected in the pile driving operation. The variable orifice control valving means 32 provides for adjustment of the frequency rate of the sonic vibrator unit 14 by controlling the amount of fluid flow to the fixed displacement hydraulic arrangement powering the sonic vibrator unit 14 and drives the wave generator thereof at different frequencies to secure optimum results under different pile driving conditions.

The arrangement as shown in FIGURE 2 of the drawing, especially relates to the compaction of material G, such as back-fills in trenches or the like. Since the details of the transport vehicle A and the component parts thereof, such as the hoisting and lowering cable means 18, the crane boom 20 and all details of the hydraulic system, as disclosed in the embodiment illustration in FIGURE 1 of the drawing, except for the positioning or location of the sonic vibrator unit 14, are the same, like characters of reference have been shown to identify similar features.

A sonic vibrator unit 114 having associated therewith a fixed displacement hydraulic arrangement, having similar operating mechanism as the vibrator unit 14 of the embodiment illustrated in FIGURE 1 of the drawing, is rigidly mounted intermediate the length of an elongated compacting head 115 which comprising an upper 115A and a lower 115B component part, preferably circular in cross-section, the diameter of all three structures 115A, 114 and 115B being substantially the same and appreciably greater than that of the sonic vibrator unit 14 of the embodiment shown in FIGURE 1 inasmuch as the arrangement 114 and 115 is intended for compacting material G which, when initially back-filled into a trench T by any suitable operation, is generally quite loose, granular and thus highly compactible.

In order to provide adequate protection for the hydraulic fluid conduit means 30 and 42, portions of which may be rendered suitably bendably flexible, an elongate rigid tubular member 117, preferably circular in cross-section, though not essential, is somewhat reduced in the transverse dimension relative to the compacting head component parts 115A and 115B and is rigidly mounted at the lower end portion thereof to the upper compacting head component part 115A but freely suspended from the hoisting and lowering cable means 18. Preferably, the cross-sections of the elongate member 117 and compacting head-sonic-vibrator unit arrangement 115 and 114 should substantially correspond to each other in shape or configuration while the transverse or lateral dimension of the elongate member 117 should be appreciably smaller than that of the compacting head 115 for ease of withdrawing the compacting head-sonic vibrator unit arrangement 115 and 114 from within the generally initially loose back-fill material G. The pressure fluid conduit means 30 and the return hydraulic fluid conduit means 42 which are connected to the fixed displacement hydraulic arrangement for the sonic vibrator unit 114 both extend down through the elongate tubular member 117. Beside the function of protecting the conduit means 30, 42 from abrasion and other forms of injury due to rocks, sand, water, etc., in the back-fill, the rigid elongate tubular member 117 is rigid with the material compacting vibrator head arrangement 115, 114 which provides for greater control over the positioning and directional movement thereof. It will be noted that the lower end portion of the compacting head component part 115B and the upper end portion of the compacting head component part 115A are both preferably of frusto-conical shape the outer terminal or end extremities of which conform generally and preferably to the transverse dimension of the tubular member 117 to provide transitional areas. The frusto-conical end portions of the parts 115A and 115B provide, as above noted, easier withdrawal of the compactor vibrator head arrangement 115, 114 for relocation at a different installation after having been sonically-driven downwardly into the back-fill material G or otherwise loose material to the maximum extent desired.

Since the hydraulic system powered by the propelling unit 22 of the transport vehicle A is similar to the hydraulic system as shown in the embodiment of the FIGURE 1, as previously noted, the description of the mode of operation of the hydraulic system will not, for the sake of brevity, here be repeated. As in the embodiment which is illustrated in FIGURE 1, the indicator device or gauge 34 provides, by a direct reading thereof, means of determining the amount of compaction or density imparted to the material G in the trench T by interpretation of the energy or power demands of the sonic vibrator unit 114.

FIGURE 3 of the drawing schematically discloses an embodiment of the subject inventive concept which comprises a transport vehicle B particularly adapted for compaction of material G which may be road subgrades, road pavement materials, such as gravel, slag, crushed stone, asphalt concrete and the like, as well as earth dam embankment materials. As illustrated, the transport vehicle B is provided with a chassis 50 supported on ground-engaging wheels 52. Journalled in a suitable bearing arrangement, not shown, from the under-side of the chassis 50, and preferably intermediate the front and rear ground-engaging wheels 52 by suitable rigid support structure, is a rotatable, eccentric-weighted shaft 54 which is rotated at sonic speed by a fixed displacement hydraulic arrangement, similar to the units 14, 114 described and disclosed above.

A device 56 preferably in the form of a material tamping or compacting plate extends for at least the width of the chassis 50 and the wheel 52 tread and is preferably, in configuration, of an inverted T in cross-section, is trunnioned by means of a vertical leg 58 on the shaft 54 and limited solely to slight vertical vibratory or sonic movement by the rotation of the shaft 54 at the sonic speed fixed by the fixed displacement hydraulic arrangement.

Obviously, two or more eccentric-weighted shafts 54 spaced fore and aft relative to the chassis 50 may be employed if desired. It will also be noted, by a comparison of FIGURE 3 with FIGURES 1 and 2 of the drawing, that the hydraulic system driven by the propusion unit 22 of the embodiment disclosed in FIGURE 3 corresponds and is similar to the hydraulic systems of the embodiments illustrated in FIGURES 1 and 2 and accordingly functions in a manner similar thereto.

Preferably, the journals for the shaft 54 provide for some vertical positional adjustment of the material tamping-compacting plate device 56 which normally, though not necessarily, is so vertically positioned that a flat mid bottom surface portion 60 thereof having upwardly inclined angle side portions 62 and 62, disposed in a substantially horizonztal plane that is common with the contact of the wheels 52 as the material G is being compacted.

As in the embodiments of the subject inventive concept as illustrated in FIGURES 1 and 2 of the drawing, the indicator device or gauge 34 provides, by a direct reading thereof, means of determining the amount of compaction or density imparted to the compacted material G by interpretation of the energy or power demands of the material tamping-compacting plate device 56.

FIGURE 4 of the drawing discloses another embodiment of the invention wherein a transport vehicle C in the form of road pavement roller equipment for rolling a surface material to be compacted is provided with the system, method, apparatus, arrangement or equipment as above described and disclosed.

As schematically illustrated in FIGURE 4, the transport vehicle C comprises a chassis or body structure 70 supported at one end portion thereof by a nonsteerable roller 72 and at the opposite or front end portion by a roller 74 mounted in yoke structure 76 by an axle 78 with the roller 74 being preferably, though not necessarily, of substantially the same size as the roller 72. The yoke structure 76 is carried by a generally vertically extending pivot shaft 80 from the body structure 70 whereby the roller 74 may be steered by an suitable means, not shown. Intermediate the rollers 72 and 74 there is provided a third or compacting roller 82, preferably of the same size as the rollers 72 and 74, which is mounted to the body structure 70 by yoke structure 84, comparable to the yoke structure 76 with the yoke structure 84 being carried by a generally vertically extending pivot shaft 86. The pivot shaft 86 may be steered in coupled relationship with the pivot shaft 80 of the front roller 74 if desired, by means not shown.

The compacting roller 82 is journalled for sonic vibrating movement on an eccentric-weighted shaft 88 which is rotated at sonic speed by a fixed displacement hydraulic arrangement 90 which corresponds to the units 14 and 114, previously described. The compacting roller 82 is limited to generally vertical vibratory movement, as induced by the rotation of the eccentric-weighted shaft 88 and is preferably, but not necessarily, positioned so that the line of contact made with the material G to be compacted lies in a substantially horizontal plane that is common with the ground contacting line of either of the rollers 72 or 74.

The hydraulic system of the embodiment of the invention as illustrated in FIGURE 4 of the drawing, which imparts sonic vibratory movement to the compacting roller 82 is similar to the hydraulic system of the preceding embodiments of the invention that have been described above and accordingly, for the sake of brevity, the component parts thereof have been identified precisely in accordance with the corresponding component parts of the previously described embodiments. Merely as a matter of arbitrary convenience, the pressure fluid reservoir or source of fluid 26 is shown in FIGURE 4 of the drawing as being mounted directly over the propulsion unit 22 that powers the hydraulic system and the propulsion of the roller vehicle drives the transport vehicle C.

The operation of the hydraulic system of the particular embodiment as illustrated in FIGURE 4 of the drawing substantially corresponds to that of the previously described embodiments. As in the previous embodiments, the pump pressure control return line or conduit means 40 which provides for control of the wobbler of the variable displacement hydraulic pump device 24, is employed as means for automatically varying the hydraulic fluid pressure of the fixed displacement hydraulic arrangement that is applied to the vertically and sonically vibrated compacting roller 82 while the indicator device 34 provides means for indicating a condition of the fluid which may be used in valuating the amount of compaction or density imparted to the material G being roller compacted by an interpretation of the energy demand of the compacting roller 82 by a direct reading of the indicator device 34.

In FIGURE 5 of the drawing there is a showing of a transport vehicle D in the form of an asphalt, concrete mechanical spreader and tamping machine or vehicle having a tamping bar 92 for tamping or compacting asphaltic material G after the material G has been spread in place by the machine D.

The asphalt spreader and tamping machine D, which is adapted for spreading and tamping any type of asphalt type road material, comprises a chassis structure 94 supporting a propulsion unit 22 corresponding to the units 22 of the embodiments previously described. Suitably journalled to the chassis structure 94, by means not shown, is a transversely extending eccentric-weighted shaft 96 rotated at sonic speeds by a fixed displacement hydraulic arrangement and vibrator unit 98 corresponding to the arrangements and the vibrator units 14, 114 of the previously described embodiments. The tamping bar 92 is journalled for sonic vibratory movement from the eccentric-weighted shaft 96 which is rotated by the fixed displacement hydraulic arrangement of the unit 98.

The mode of operation of the hydraulic system of the embodiment as illustrated in FIGURE 5 of the drawing, is ismilar to that of the previously described embodiments. As the compaction or density of the material G increases under the sonic vibratory tamping action of tamping bar 92, the increased density of the material G tends to build up resistance to the sonic vibratory movement of the tamping bar 92. This build-up of resistance causes a corresponding build-up in the pressure of the hydraulic pressure fluid conduit means 30 and the connecting pump pressure control conduit means 40 that extends back to and controls the wobbler of the variable displacement hydraulic pump device 24. The increased hydraulic pressure in the conduit means 40 accordingly adjusts the wobbler of the pump device 24 to increase the displacement thereof for a given r.p.m. of the propulsion unit 22 of the transport vehicle D to provide a greater hydraulic pressure output in the pressure fluid conduit means 30 and the associated conduit means 40.

As in the previously described embodiments, the indicator device 34 provides, by a direct reading thereof, means for indicating a condition of the fluid which may be used in determining the amount of compaction or density imparted to the compacted material G by interpretation of the energy or power demands of the tamping bar 92. Also, as in the previously described embodiments, the variable orifice control valving means 32 provides for adjustment of the frequency rate of the wave generator in the sonic vibrator unit 98 to secure optimum results under different and varying conditions of the material G, such as thickness, temperature, etc.

From the above description and disclosure it should be appreciated that there is herein described, disclosed, illustrated and shown, various embodiments or modifications of a novel system, method, arrangement, mechanism, equipment or apparatus for compacting various kinds of materials by sonic vibratory means powered by a novel hydraulic system wherein the hydraulic system provides means of determining simultaneously with the compacted material by interpetation of the power demands of compacting means employed in each instance and also simultaneously automatically adjusting the power output of the hydraulic system in accordance with the compaction imparted to the compacted material.

While the novel system, method, equipment, arrangement, mechanism and apparatus of the subject inventive concept has been described, disclosed, illustrated and shown in the environment of certain types of transport vehicles, it is to be noted that certain structural features of the subject novel inventive concept are common between the various embodiments or modifications which have been illustrated and shown in combination with the transport vehicles A, B, C and D; for example, the sonic vibrator unit 14 and the fixed displacement hydraulic arangement; the propulsion unit 22; the variable displacement hydraulic pump device 24; the source of fluid 26; the variable orifice control valving means 32; the indicator device 34, as well as the various conduit means 28, 30, 36, 40 and 42. While the governor device 38 has been shown in only the embodiment or modification of the subject inventive concept illustrated in FIGURE 1 of the drawing, it is to be understood that the governor device 38 and the associated control branch conduit means 36 may also be employed with the other embodiments or modifications which are illustrated in FIGURES 2–5 respectively, wherein the governor device 38 would be controlling the respective propulsion unit 22 thereof.

Further, in passing, it is to be understood that the fixed differential hydraulic arrangement of the sonic vibrator unit 14 is preferably in the nature of a hydraulic motor.

Also, while the transport vehicles A, B, C and D respectively relate to certain operational functions and have associated respectively therewith equipment such as the pile unit 10, clamp device 12, suspension 16, cable means 18 and the crane boom 20; the shaft 54 and the tamping compacting plate 56; the compacting roller 82 and shaft 88, and the tamping bar 92 and associated shaft 96, the hydraulic actuating mechanism is fundamentally the same in each instance. It is contemplated, as regards the arrangement shown in FIGURE 1, that if desired the adapter clamp device 12 may be hydraulically actuated and powered by means of a branch conduit connection with the pressure fluid conduit means 30.

Likewise, in the arrangement shown in FIGURE 4 it is to be understood that the vertical pivot shaft 86 may comprise a component part of a hydraulic jack having a branch conduit connection with the pressure fluid conduit means 30 for applying vertical pressure on the vibrator roller yoke structure 84 in conformity with the hydraulic pressure obtaining at any instant in the pressure fluid conduit means 30. If desired, a manually operable valve means may also be located in the branch conduit between the hydraulic jack and the pressure fluid conduit means 30 if it is further desired to provide a manually selective control of the presure of the hydraulic fluid applied to the hydraulic jack.

While the invention has been described, disclosed, illustrated and shown in terms of certain preferred embodiments or modifications which it has assumed in practice, the scope of the invention should not be deemed to be limited by the precise certain embodiments or modifications herein shown, described, illustrated and disclosed, such other embodiments or modifications being intended to be reserved as they fall within the scope of the claims here appended.

I claim as my invention:

1. In an arrangement for compacting material by sonic vibrations, said arrangements comprising, in combination,
   structure for supporting sonic compacting means thereon in a position for compacting material,
   a hydraulic system containing fluid under pressure for powering said sonic cnmpacting means,
   said hydraulic system comprising
   a pump device,
   control structure for varying the displacement of the pump device,
   fluid pressure supply conduit means for placing the fluid pressure discharge of the pump device in communication with the sonic compacting means,
   valving for selectively controlling the fluid pressure discharge of the pump device through the fluid pressure supply conduit means,
   control conduit means for transmitting the developed fluid pressure of the discharged fluid in the fluid pressure supply conduit means directly back to the pump control structure by placing the fluid pressure supply conduit means in direct communication with the pump control structure,
   said control conduit means extending directly between the pump control structure and the fluid pressure supply conduit means at a location therealong which is downstream from the valving to enable the fluid pressure which is transmitted through the control conduit means to the pump control structure to be effective in varying the fluid pressure discharge of the pump device in direct response to the demand which has been placed thereon by the sonic compacting means which is being operated thereby.

2. The arrangement for compacting material, as recited in claim 1, wherein
   said hydraulic system comprises means for indicating a condition of the fluid to valuate the amount of compaction imparted to the material by a determination of the energy demand of said sonic compacting means.

3. The arrangement for compacting material, as recited in claim 1 wherein
   said hydraulic system further comprises
   a power source for operating the pump device,
   a control device for said power source, and
   branch conduit means for connecting the control conduit means to the control device of the power source to enable the control device of the power source to vary the speed thereof in response to energy demands placed on the hydraulic system by the sonic compacting means.

4. In an arrangement for compacting material, said arrangement comprising, in combination,
   structure for supporting material compacting means,
   a hydraulic system containing fluid under pressure for powering said material compacting means,
   said hydraulic system comprising
   a pump device,
   control structure for varying the displacement of the pump device,
   fluid pressure supply conduit means for placing the fluid pressure discharge of the pump device in communication with the material compacting means, valving for selectively controlling the fluid pressure discharge of the pump device through the fluid pressure supply conduit means, control conduit means for transmitting the developed fluid pressure of the discharged fluid in the fluid pressure supply conduit means directly back to the pump control structure by placing the fluid pressure supply conduit means in direct communication with the pump control structure, said control conduit means extending directly between the pump control structure and the fluid pressure supply conduit means at a location therealong which is downstream from the valving to enable the fluid pressure which is transmitted through the control conduit means to the pump control structure to be effective in varying the fluid pressure discharge of the pump device in direct response to the demand which has been placed thereon by the material compacting means which is being operated thereby, a source of energy for powering said hydraulic system to actuate said material compacting means.

5. The arrangement for compacting material as recited in claim 4, wherein said hydraulic system further comprises means for valuating the amount of compaction being imparted to material as the compacting takes place, said last named means comprising an indicator device disposed at a location along the fluid pressure supply conduit means which is downstream relative to the control conduit means for providing a reading of current pressure of the fluid in the hydraulic system.

6. In an arrangement for compacting material, said arrangement comprising, in combination, movable structure for supporting said arrangement, a source of energy for driving said movable structure, a hydraulic system comprising a variable displacement hydraulic pump device, control structure for varying the fluid discharge of the pump device, said pump device being coupled in powered relation to said source of energy, a source of fluid in communication with said pump device, material compacting means, and a hydraulic arrangement for powering said material compacting means, said hydraulic arrangement comprising fluid pressure supply conduit means for placing the fluid pressure discharge of the pump device in communication with the hydraulic arrangement for powering the material compacting means, valving for selectively controlling the fluid pressure discharge of the pump device through the fluid pressure supply conduit means, and control conduit means for transmitting the developed fluid pressure of the discharged fluid in the fluid pressure supply conduit means directly back to the pump control structure by placing the fluid pressure supply conduit means in direct communication with the pump control structure, said control conduit means extending directly between the pump control structure and the fluid pressure supply conduit means at a location therealong which is downstream from the valving to enable the fluid pressure which is transmitted through the control conduit means to the pump control structure to be effective in varying the fluid pressure discharge of the pump device in direct response to the demand which has been placed thereon by the material compacting means which is being operated thereby.

7. The arrangement for compacting material as recited in claim 6 together with a pressure gauge disposed in said fluid pressure supply conduit means at a location therealong which is downstream relative to the control conduit means for conducting pressure fluid from said pump device to said hydraulic arrangement, said pressure gauge providing a visual indication of the pressure of the fluid supplied to said hydraulic arrangement during compacting operations to enable the valuation of density being imparted to material being compacted by the material compacting means.

8. In combination with a material compacting transport vehicle having a propulsion unit therefor, a hydraulic system comprising a variable displacement hydraulic pump device, control means for varying the fluid pressure discharge of the pump device, said pump device being coupled in powered relationship to said propulsion unit of the transport vehicle, hydraulic means powered by said pump device, material compacting means powered by said hydraulic means, fluid pressure supply conduit means for placing the fluid pressure discharge of the pump device in communication with the hydraulic means for powering the material compacting means, valving for selectively controlling the fluid pressure discharge of the pump device through the fluid pressure supply conduit means, control conduit means for transmitting the developed fluid pressure of the discharged fluid in the fluid pressure supply conduit means directly back to the pump control means by placing the fluid pressure supply conduit means in direct communication with the pump control means, said control conduit means extending directly between the pump control means and the fluid pressure supply conduit means at a location therealong which is downstream from the valving to enable the fluid pressure which is transmitted through the control conduit means to the pump control means to be effective in varrying the fluid pressure discharge of the pump device in direct response to the demand which has been placed thereon by the material compacting means which is being operated thereby, means for indicating a condition of the fluid in order to determine the degree of compaction being effected by the material compacting means.

9. The material compacting transport vehicle as recited in claim 8, wherein said propulsion unit comprises speed governor means, and said hydraulic system further comprises branch conduit means connecting the pump device and the hydraulic means to the speed governor means to vary the speed of said propulsion unit in response to the pressure discharge of the pump device as adjusted by the demands of said material compacting means.

10. The material compacting transport vehicle as recited in claim 8, wherein said last named means constantly provides a visual indication of the pressure existing in said hydraulic system to interpret and valuate the degree of compaction of material being compacted by said material compacting means throughout the entire interval that such material is being compacted.

11. The material compacting transport vehicle as set forth in claim 8, wherein said material compacting means comprises a piling unit, means for suspending said piling unit from the vehicle, and means for disposing said hydraulic means and said material compacting means adjacent the piling unit in operative relationship relative thereto.

12. The material compacting transport vehicle as set forth in claim 8, wherein
said vehicle comprises
a chassis having ground engaging wheel assemblies,
said material compacting means comprises
an eccentric rotatably mounted shaft carried by said chassis and a plate-like portion for compacting material,
said hydraulic means being operable to rotate said eccentric shaft, and
means for suspending said plate-like portion of the material compacting means from the eccentric shaft thereof to enable said plate-like portion to be vibrated on rotation of the eccentric shaft and thus compact material.

13. The material compacting transport vehicle as recited in claim 8, wherein
said vehicle comprises
an elongate chassis having ground engaging longitudinally spaced apart substantially cylindrical roller devices disposed adjacent each end portion thereof,
yoke-like structure pivotally supported by one end portion of the chassis for pivotal movement about a generally vertically extending axis,
means rotatably mounting one of said roller devices to said yoke-like structure for rotation about a generally horizontally extending axis,
means mounting the other roller device to the other end portion of the chasis for rotation about another generally horizontally extending axis that is substantially parallel to the horizontal rotational axis of the said one roller device,
an additional yoke-like structure disposed intermediate the said roller devices and pivotally supported by an intermediate portion of the chassis for pivotal movement about a generally vertically extending axis that is substantially parallel to the vertical pivotal axis of the first mentioned yoke-like structure, and
said material compacting means comprises
an additional substantially cylindrical roller device,
an eccentric shaft journalled on the additional yoke-like structure for rotatably mounting the additional roller device thereto for rotation about a generally horizontally extending axis that is substantially parallel to the horizontal rotational axes of the one and the other roller devices, and
said hydraulic means is operable to rotate the eccentric shaft of the material compacting means to vibrate the additional roller device and thus compact material.

14. The material compacting transport vehicle as set forth in claim 8, wherein
said vehicle comprises
a chassis,
said material compacting means comprises
an eccentric rotatably mounted shaft carried by said chassis for rotation about a generally horizontally extending axis,
tamping structure for tamping material,
means for supporting said tamping structure from the eccentric shaft to enable said tamping structure to have vibratory movement on rotation of said shaft, and
means for enabling the hydraulic means of the hydraulic system to rotate the eccentric shaft of the material compacting means to effect vibratory movement to the tamping structure thereof.

References Cited by the Examiner
UNITED STATES PATENTS

| | | | |
|---|---|---|---|
| 2,015,891 | 10/1935 | Greiner | 94—50 |
| 2,897,734 | 8/1959 | Bodine | 94—48 X |
| 2,938,438 | 5/1960 | Hamilton | 94—48 |
| 2,952,193 | 9/1960 | Converse | 94—48 |
| 2,975,846 | 3/1961 | Bodine | 175—19 |
| 3,009,401 | 11/1961 | Greiner | 94—50 |
| 3,099,942 | 8/1963 | Leister | 94—50 |

CHARLES E. O'CONNELL, *Primary Examiner.*
JACOB L. NACKENOFF, *Examiner.*
N. C. BYERS, *Assistant Examiner.*